United States Patent
Rose et al.

(10) Patent No.: US 12,452,565 B1
(45) Date of Patent: Oct. 21, 2025

(54) INTERPRETATION AND TRANSFORMATION OF UNSTRUCTURED HUMAN INPUT TO ENABLE END-TO-END SERVICE VISIBILITY

(71) Applicant: LIGHTRIVER TECHNOLOGIES, INC., Concord, CA (US)

(72) Inventors: Daniel W. Rose, Red Bank, NJ (US); Timothy Wayne Masse, Spring Hill, TN (US); Frank M. Massa, Red Bank, NJ (US)

(73) Assignee: LIGHTRIVER TECHNOLOGIES, INC., Concord, CA (US)

( * ) Notice: Subject to any disclaimer, the term of this patent is extended or adjusted under 35 U.S.C. 154(b) by 0 days.

(21) Appl. No.: 19/257,042

(22) Filed: Jul. 1, 2025

Related U.S. Application Data

(63) Continuation of application No. 19/217,611, filed on May 23, 2025.

(51) Int. Cl.
  *H04Q 11/00* (2006.01)
  *H04L 41/16* (2022.01)

(52) U.S. Cl.
  CPC ......... *H04Q 11/0062* (2013.01); *H04L 41/16* (2013.01); *H04Q 2011/0073* (2013.01); *H04Q 2011/0083* (2013.01); *H04Q 2213/13343* (2013.01)

(58) Field of Classification Search
  CPC .................................................. H04Q 11/0062
  See application file for complete search history.

(56) References Cited

U.S. PATENT DOCUMENTS

| | | | |
|---|---|---|---|
| 2015/0200838 A1* | 7/2015 | Nadeau ............. | H04L 45/50 370/254 |
| 2025/0039134 A1* | 1/2025 | Roquemore ........ | H04L 41/0806 |

OTHER PUBLICATIONS

Wang et al., "When Large Language Models meet optical networks: Paving the Way for Automation", arXiv:2045.17441v2, Jun. 2024 (Year: 2024).*

* cited by examiner

*Primary Examiner* — Shi K Li
(74) *Attorney, Agent, or Firm* — Sterne, Kessler, Goldstein & Fox, P.L.L.C.

(57) ABSTRACT

Some embodiments enable the interpretation and transformation of unstructured human input to enable end-to-end service visibility across a transport network. Some embodiments include assembling and sending a prompt to a large language model (LLM) to interpret and transform examples of unstructured human input describing a circuit to network element (NE) information, where the NE information can be used to identify neighbor devices between different vendor products providing a service. The LLM can output data points that enable identifying neighboring devices on an end-to-end service path that includes multi-vendor and/or multigenerational devices. The data points used in conjunction with inventory data enables neighboring connections to be determined so that islands of different multi-vendor and/or multigenerational devices can be connected to neighbor devices along the end-to-end service path. The neighboring connections can be added to an inventory database enabling visibility end-to-end service path.

20 Claims, 13 Drawing Sheets

500

```
1   [
2       {
3           "circuit": "1545.32_-_A_NODE1234_1/14-B_NODE-98786_28/2",
4           "wavelength": 1545.32",
5           "reserved": false,
6           "tids": [
7               {
8                   "tid": "NODE1234",
9                   "side": "A",
10                  "shelf": "1",
11                  "slot": "14",
12                  "port": "UNKNOWN",
13              },
14              {
15                  "tid": "NODE-98786",
16                  "side": "B",
17                  "shelf": "28",
18                  "slot": "2",
19                  "port": "UNKNOWN",
20              }
21          ]
22      },
23      {
24          "circuit": "1543.33_-_B_nod-45234_4/2-A_NODE1234o31_25/7_100G-Guide",
25          "wavelength": 1543.33",
26          "reserved": false,
27          "tids": [
28              {
29                  "tid": "NODE-45234",
30                  "side": "B",
31                  "shelf": "4",
32                  "slot": "2",
33                  "port": "UNKNOWN",
34              },
35              {
36                  "tid": "NODE1234o31",
37                  "side": "A",
38                  "shelf": "25",
39                  "slot": "7",
40                  "port": "UNKNOWN",
41              }
42          ]
43      },
44  ]
```

FIG. 5

| Near End Transponder Port | Near End Filter Port | Circuit ID (e.g., circuit name) | Far end Node & filter port | Far end Transponder port |
|---|---|---|---|---|
| CHAN-1-14-2 | PCHAN-3-20 | 1545.32_-_A_NODE1234_1/14-B_NODE-98786_28/2 | NODE-98786 PCHAN-5-20 | CHAN-28-2-2 |
| CHAN-25-7-2 | PCHAN-5-17 | 1543.33_B_node-45234_4/2-A_NODE1234o31_25/7_100G_Guide | node-45234 PCHAN-11-17 | CHAN-4-2-2 |
| CHAN-11-2-2 | PCHAN-5-18 | 1544.13-DegA_NODE1234o31_11/2_to_DegB_NODE-98786o31_5/3 | NODE-98786o31 PCHAN-10-18 | CHAN-5-3-2 |
| CHAN-21-4-2 | PCHAN-5-34 | 1556.96_-_A_NODE1234_21/4_-_B_NODE-98786_18/4 | NODE-98786 PCHAN-10-34 | CHAN-18-4-2 |
| CHAN-8-6-2 | PCHAN-5-37 | 1559.39_B_NODE-98786_23/6-A_NODE1234-01o_8/6 | NODE-98786 PCHAN-10-37 | CHAN-23-6-2 |
| CHAN-25-6-2 | PCHAN-5-38 | 1560.20-A_Side_NODE1234-01o_25/6_-_B_Side_NODE-98786_28/7_WAG | NODE-98786 PCHAN-10-38 | CHAN-28-7-2 |
| CHAN-4-6-5 | PCHAN-10-3 | 1531.90_-_B_NODE1234_4/6-A_Node--7652_1/6 | Node--7652o31 PCHAN-2-3 | CHAN-1-6-5 |
| CHAN-1-6-2 | PCHAN-10-39 | 1560.61_A_node-45234_3/4-B_NODE1234o31_1/6_100G_Guide | node-45234 PCHAN-3-39 | CHAN-3-4-2 |

FIG. 9

Standardized Data Model (Simplified) 1200

Ports

| NE | AID | Label | Wavelength | WDM side |
|---|---|---|---|---|
| NODE1234 | CHAN-1-14-2 | 1545.32_-_A_NODE1234_1/14-B_NODE-98786_28/2 | 1545.32 | |
| NODE1234 | PCHAN-3-20 | 1545.32_-_A_NODE1234_1/14-B_NODE-98786_28/2 | 1545.32 | A |
| NODE-98786 | CHAN-28-2-2 | 1545.32_-_A_NODE1234_1/14-B_NODE-98786_28/2 | 1545.32 | |
| NODE-98786 | PCHAN-5-20 | 1545.32_-_A_NODE1234_1/14-B_NODE-98786_28/2 | 1545.32 | B |

1210P, 1220P, 1230P, 1240P

AID Components

| NE | AID | Shelf | Slot | Port |
|---|---|---|---|---|
| NODE1234 | CHAN-1-14-2 | 1 | 14 | 2 |
| NODE1234 | PCHAN-3-20 | 3 | 20 | |
| NODE-98786 | CHAN-28-2-2 | 28 | 2 | 2 |
| NODE-98786 | PCHAN-5-20 | 5 | 20 | |

1210C, 1220C, 1230C, 1240C

Network Data

Vendor A

1210
- NE: NODE1234
- AID: CHAN-1-14-2
1212 LABEL: 1545.32_-_A_NODE1234_1/14-B_NODE-98786_28/2
1214 WAVELEN: 1545.32

1220
- NE: NODE1234
- AID: PCHAN-3-20
1222 LABEL: 1545.32_-_A_NODE1234_1/14-B_NODE-98786_28/2
1224 WAVELEN: 1545.32
- WDMSIDE: A

Vendor B

1230
- NE: NODE-98786
- AID: CHAN-28-2-2
1232 DESCR: 1545.32_-_A_NODE1234_1/14-B_NODE-98786_28/2
1234 PORT: 20

1240
- NE: NODE-98786
- AID: PCHAN-5-20
1242 DESCR: 1545.32_-_A_NODE1234_1/14-B_NODE-98786_28/2
1244 PORT: 20
1246 DEGREE: B

FIG. 12

INTERPRETATION AND TRANSFORMATION OF UNSTRUCTURED HUMAN INPUT TO ENABLE END-TO-END SERVICE VISIBILITY

CROSS-REFERENCE TO RELATED APPLICATION

This application is a continuation of U.S. application Ser. No. 19/217,611, filed May 23, 2025, entitled "Interpretation and Transformation of Unstructured Human Input to Enable End-to-End Service Visibility" which is incorporated herein by reference in its entirety.

FIELD OF THE INVENTION

The embodiments relate generally to managing networks supporting end-to-end services.

BACKGROUND

Communication networks often include communication devices from multiple vendors and multiple generations of network technology.

Networks with multi-vendor and multi-generational devices face challenges in obtaining end-to-end service path visibility because the transport service signaling does not contain that information at all time division multiplexing (TDM), synchronous optical network (SONET)/synchronous digital hierarchy (SDH), and dense wavelength division multiplexing (DWDM) layers for network management systems to obtain. Also, vendor specific network management systems only communicate with equipment provided by the same manufacturer. Multi-generational devices can include devices that are obsolete; obsolete devices are no longer supported or maintained by their manufacturer even though they may be actively utilized in a network. Thus, vendor-specific network management systems may not have service path visibility across networks with multi-vendor and multi-generational devices.

Human labels entered for each network element service port may be available to identify the service path. However, these human labels are generally unstructured. These unstructured human input labels are often highly irregular and can be difficult to decipher. Additionally, the name of those port label fields is specific to each network element type, the network element software release, the network element equipment and can be stored in different locations depending on the service type. Accordingly, obtaining end-to-end service path visibility can be difficult across networks that include multi-vendor and multi-generational devices.

BRIEF SUMMARY

Some embodiments include a system, apparatus, method, and computer program product for interpreting and transforming unstructured human input to enable end-to-end service visibility. To determine an end-to-end service path, some embodiments assemble a prompt that includes (i) a plurality of example circuit names, (ii) for each example circuit name in the plurality of example circuit names, data points corresponding to circuit endpoints of a service corresponding to a respective example circuit name, and (iii) a first circuit name for interpretation. The assembled prompt is sent to a large language model (LLM) to determine first data points of a first endpoint and second data points of a second endpoint, where the first endpoint and the second endpoint belong to a service path corresponding to the first circuit name. The LLM can also determine the third data point of a third endpoint and a fourth data point of the fourth endpoint. Some embodiments derive using the first and second data points, a neighbor connection to be created between the corresponding first endpoint, and corresponding second endpoint. Some embodiments derive using the third and fourth data points, a neighbor connection to be created between the corresponding third endpoint and corresponding fourth endpoint. Further, some embodiments identify first neighbor ports and second neighbor ports based at least on inventory data, the first neighbor connection to be created, and the second neighbor connection to be created, and determine the service path based at least on the first neighbor ports and the second neighbor ports.

To identify the first neighbor ports, some embodiments identify a first transponder port of the first endpoint based at least on the inventory data corresponding to the first data points comprising: a near end node, a shelf and slot of the first endpoint, and a wavelength frequency. Further, some embodiments identify a first filter port of the first neighbor connection based at least on the inventory data corresponding to the first data points comprising: the wavelength frequency and a first wavelength-division multiplexing (WDM) side of the near end node.

Some embodiments can update an inventory database including the inventory data, to include the first neighbor connection based on the first neighbor node name and port and the second neighbor connection based on the second neighbor node name and port, corresponding to the same respective example circuit name, where the first and second endpoints and node names identify the same location (e.g., data center, central office, data equipment cage, etc.).

BRIEF DESCRIPTION OF THE DRAWINGS/FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 5 illustrates an example of obtaining data points corresponding to an end-to-end service, according to some embodiments of the disclosure.

FIG. 9 illustrates an example of data points based on interpretation and transformation of unstructured human input, according to some embodiments of the disclosure.

FIG. 12 illustrates vendor reports in various formats, and a standardized data model, according to some embodiments of the disclosure.

Figure 1A:
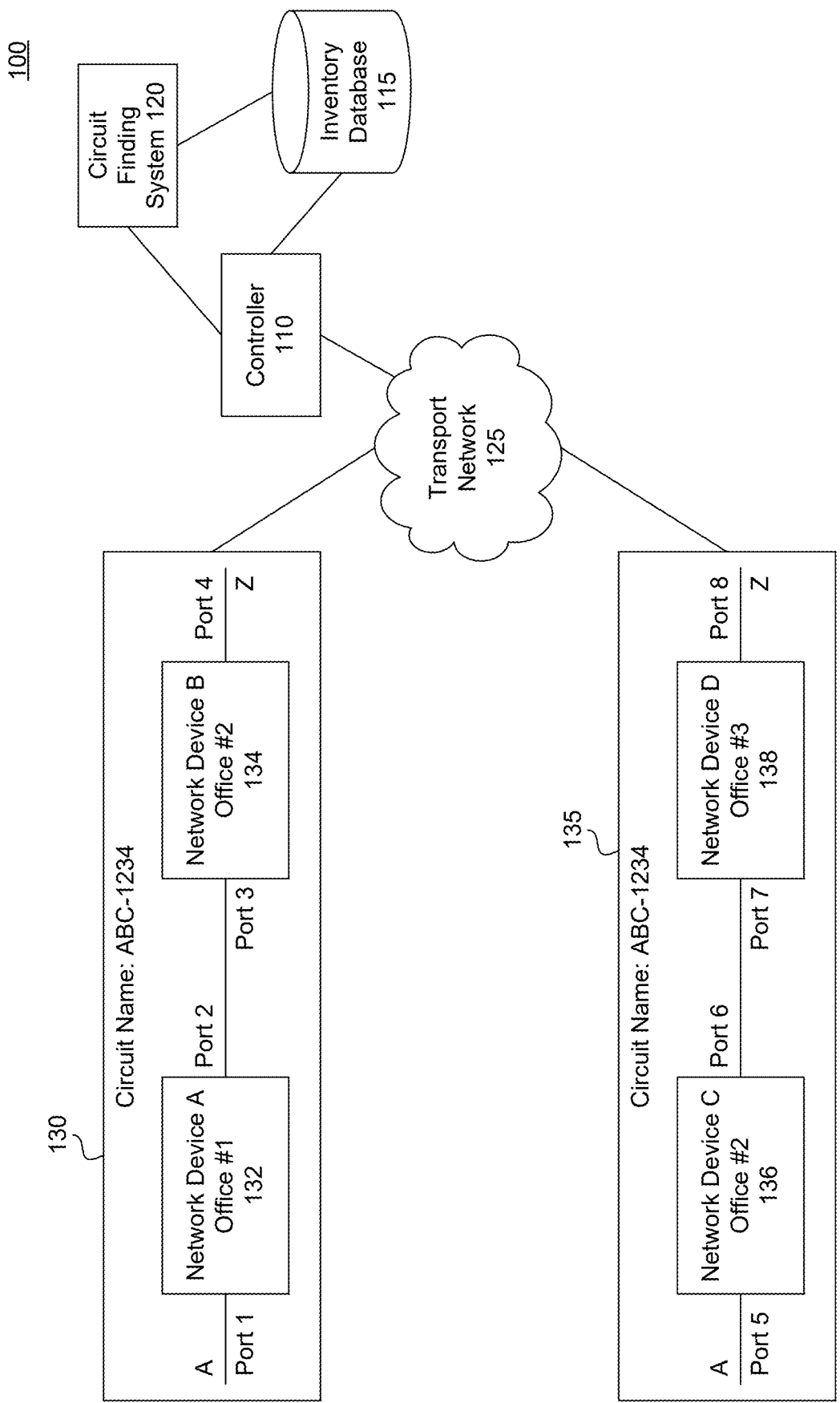
FIG. 1A illustrates an example system supporting interpretation and transformation of unstructured human input to enable end-to-end service visibility, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Some embodiments include a system, apparatus, article of manufacture, method, and/or computer program product and/or combinations and sub-combinations thereof, for the interpretation and transformation of unstructured human input to enable end-to-end service visibility. Network management systems can provision, maintain, and manage components along an end-to-end service path to support quality service and customer satisfaction. But, the end-to-end service path is not always visible due to inconsistent vendor-reports for their respective devices as well as unstructured human input labels used to describe end-to-end service paths. Some embodiments enable the determination of end-to-end service paths by interpreting and transforming unstructured human input labels, using inventory data based on vendor-specific report, and determining neighbors (device neighbors) for which a neighbor connection should be created along the service path. Neighbor connections can be missing links between network devices that impede the visibility of the end-to-end service path.

Network management systems can discover dense wavelength-division multiplexing (DWDM)/transport network devices in a network, but each vendor provides a vendor specific report. Packet, synchronous optical network (SONET)/synchronous digital hierarchy (SDH) and time division multiplexing (TDM) devices also have vendor specific network discovery and reporting. Often, the network management system needs to interpret each vendor-specific report to a standardized data model as shown in FIG. 12. Some embodiments include transforming information from vendor reports in native vendor data to a standardized data model in a query-able format. When connections between DWDM devices from different vendors are made, even with the standardized data model, neither of the DWDM devices can provide information on the neighbor port of the other DWDM device. Thus, the network management system has an incomplete view of the end-to-end service path and islands of DWDM devices can exist in an inventory database. Ethernet, SONET/SDH and TDM networks and services have the same limitation. Circuits providing end-to-end services can be recorded using unstructured human input labels. But, the content of the labels are variable and inconsistent. Thus, deciphering each label to determine the missing neighbor connections can be a unique and laborious task. As networks grow to include multi-vendor and multi-generational devices, so does the need to determine the missing neighbor connections to enable end-to-end service path visibility. Some embodiments include a multi-vendor and multi-generational network management system that can combine equipment information into a single database, and provide the ability to stitch service ports together creating an end to end path, either manually or with automation.

Some embodiments include assembling a prompt that includes examples of unstructured human input labels, corresponding key parameters (e.g., data points) of the unstructured human input labels, as well as a first circuit name for interpretation. The assembled prompt can be sent to a large language model (LLM) to determine data points of a service path of the first circuit name. The data points in conjunction with inventory data can be used to determine which network ports should be neighbor connections in a database representing a complete end-to-end service path.

FIG. 1A illustrates example system 100 supporting interpretation and transformation of unstructured human input to enable end-to-end service visibility, in accordance with some embodiments of the disclosure. System 100 can include controller 110, circuit finding system 120, inventory database 115, transport network 125 as well as circuit 130 and circuit 135.

Controller 110 can be an optical controller that can execute operations to manage components of transport network 125. Controller 110 can be implemented in an electronic device close to transport network 125 or in a data center with portions of transport network 125. In some examples, controller 110 can communicate directly with: one or more multi-generational multi-vendor transport network elements of transport network 125 or on a different data center through a secure, cloud-based connection.

Transport network 125 includes a set of optical network elements (NE) connected by optical fiber or electrical links that provide functions for transporting, multiplexing, switching, managing, supervision and survivability of optical channels carrying client signals. Each NE may re-time, re-amplify, or re-shape photonic light signals from the optical fiber links. Payloads from various clients are transported across transport network 125, preserving the clients' native structure, timing information, and management information. Circuits in transport network 125 can potentially be multiplexed at different wavelengths of light, utilize asynchronous Ethernet packet transmission, or utilize time division multiplexing for end to end service transmission. The payloads can include any type of network traffic including multimedia services, mobile applications, social media, VoIP, and cloud computing. The enhanced multiplexing capability of transport networking allows different traffic types-including Optical Transport Unit (OTU) frame, Ethernet, storage, and digital video, as well as SONET/SDH. Transport network 125 can include both backbone transmission and can extend into data centers and directly to homes and businesses. Data centers are facilities where the equipment is located and can include Central Offices.

Inventory database 115 can be a multi-vendor/multi-generational optical domain controller database. Inventory database 115 enables tracking of different customers, their associated network services (e.g., VLAN, Ethernet, Internet, etc.), and the NEs used to provide the network services. When a new service is added to inventory database 115, a provisioning server (e.g., controller 110) may push configuration messages to NEs, and the configured NEs are recorded in inventory database 115. When an existing service is modified, for example, to change a service level, the provisioning server may look to inventory database 115 to determine which NEs to send messages to. In this way, a central provisioning server and inventory database 115 may determine which NEs need to be configured. FIG. 12 illustrates example 1200 that includes vendor reports in various formats, and a standardized data model, according to some embodiments of the disclosure. Some embodiments include transforming information from vendor reports in native vendor data to a standardized data model in a query-able format.

Circuit finding system 120 can be a computing device that can interpret and transform unstructured human input labels and identify key parameters (e.g., data points) from the labels. In some embodiments, circuit finding system 120 can determine which network ports should be associated together in inventory database 115 to represent a complete end-to-end service path. In some examples, circuit finding system includes an LLM. In some embodiments, functions of circuit finding system 120 and controller 110 can be combined into one system.

In some examples, unstructured human input labels such as circuit identifiers (IDs) indicate that nodes or network elements (NE) belong to separate service paths. Analysis of the labels according to some embodiments can determine that the NEs may be communicatively connected and are actually part of the same end-to-end service path. FIG. 1A example system 100 also includes circuit 130 and circuit 135 that traverse different networks. Circuit 130 can include endpoints A to Z that can be discovered from the network, where endpoint A is port 1 of network device A 132 and endpoint Z is port 4 of network device B 134. Similarly, circuit 135 can include endpoints A to Z that can be discovered from the network, where endpoint A is port 5 of network device C 136 and endpoint Z is port 8 of network device D 138. In some instances, however, an unstructured human input can be used to name the label (e.g., circuit name: ABC-1234) of circuit 130, circuit 135, as well as identify the common location of network devices within circuit 130 and circuit 135. For example, when network device B 134 and network device C 136 are provisioned and connected in Office #2, all of the information may not have been entered into inventory database 115. Thus, circuit 130 and circuit 135 appear as two separate circuits, and end-to-end service visibility is not possible. In some examples, circuit 130 and circuit 135 can be included in transport network 125.

Figure 2:
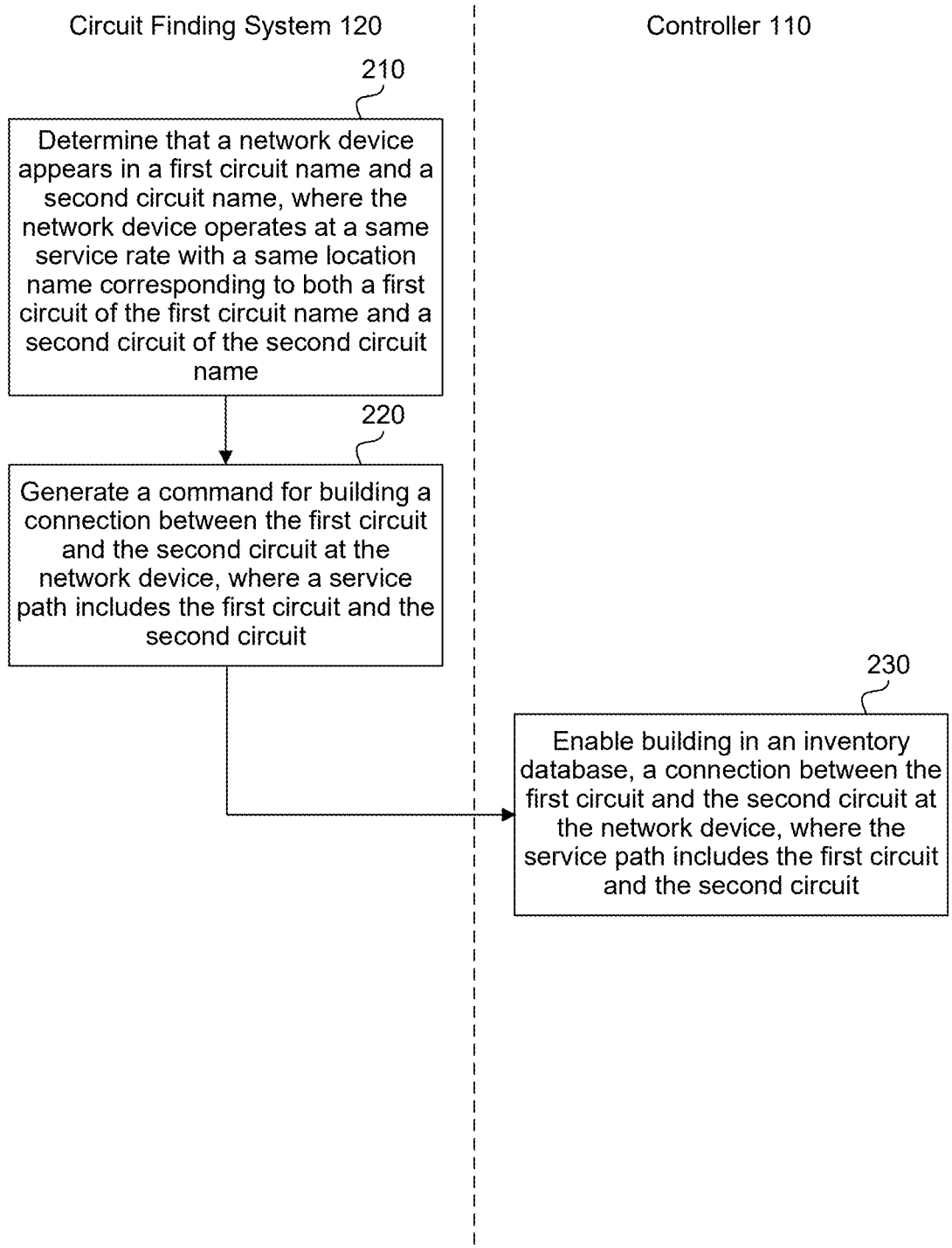
FIG. 2 illustrates an example method for using interpreted and transformed unstructured human input for combining points of a same circuit to enable end-to-end service visibility, according to some embodiments of the disclosure.

FIG. 2 illustrates example method 200 for using interpreted and transformed unstructured human input for combining points of a same circuit to enable end-to-end service visibility, according to some embodiments of the disclosure. As a convenience and not a limitation, FIG. 2 may be described with reference to elements from other figures in the disclosure. For example, FIG. 2 can describe, at a high level, interactions between controller 110, circuit finding system 120, and inventory database 115 of FIG. 1A.

At 210, circuit finding system 120 can analyze data in inventory database 115 and determine that a network device (e.g., network device B 134) appears in a first circuit name (e.g., ABC-1234) and a second circuit name (e.g., ABC-1234) where the network device (e.g., network device B 134) operates at a same service rate with a same location name (e.g., Office #2) corresponding to both a first circuit (e.g., circuit 130) of the first circuit name and a second circuit (e.g., circuit 135) of the second circuit name.

At 220, circuit finding system 120 can generate a command for building a connection between the first circuit (e.g., circuit 130) and the second circuit (e.g., circuit 135) at the network device (e.g., network device B 134), where a service path includes the first circuit and the second circuit. Circuit finding system 120 can transmit the command information to controller 110 or inventory database 115. The command can build a neighbor between two ports.

At 230, controller 110 can receive the command information from circuit finding system 120. Controller 110 can use the command information to enable building in an inventory database (e.g., inventory database 115), a connection between the first circuit (e.g., circuit 130) and the second circuit (e.g., circuit 135) at the network device (e.g., network device B 134), where the service path includes the first circuit (circuit 130) and the second circuit (circuit 135). In other words, controller 110 can transmit a signal to inventory database 115 that includes the command information so that port 4 and port 5 can be combined (e.g., stitched together) in inventory database 115, and circuit 130 and circuit 135 are shown as two legs of the same circuit. Consequently, circuit name ABC-1234 includes a service path from endpoint A at port 1 and endpoint Z at port 8, and that service path is visible in database 115 and accessible by controller 110. The end-to-end service path visibility can be used to troubleshoot problems and maintain service quality.

Figure 1B:
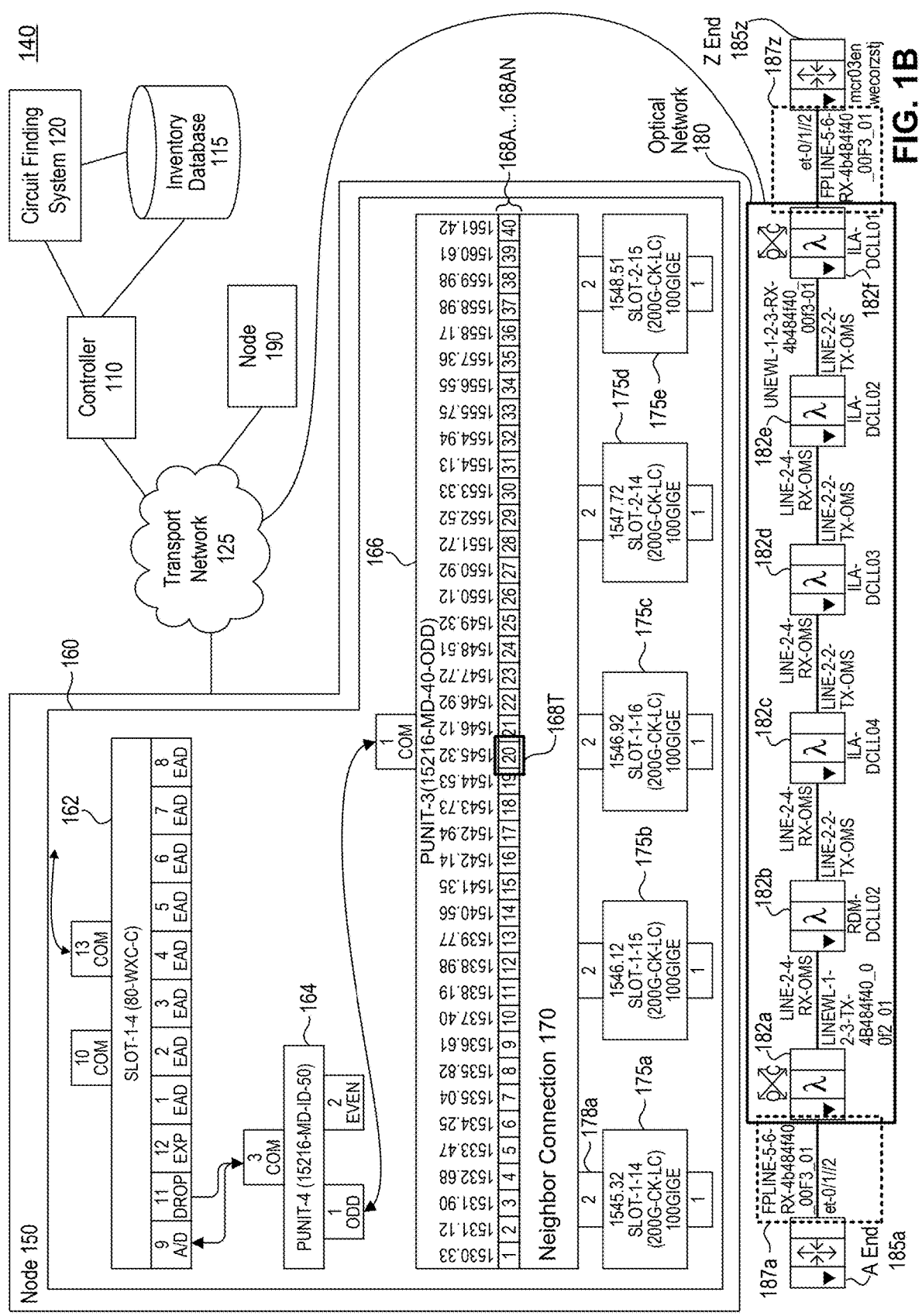
FIG. 1B illustrates another example system supporting interpretation and transformation of unstructured human input to enable end-to-end service visibility, in accordance with some embodiments of the disclosure.

FIG. 1B illustrates example system 140 supporting interpretation and transformation of unstructured human input to enable end-to-end service visibility, in accordance with some embodiments of the disclosure. As a convenience and not a limitation, FIG. 1B may be described with reference to elements from other figures in the disclosure. For example, FIG. 1B can include controller 110, circuit finding system 120, inventory database 115, and transport network 125 of FIG. 1A. As described above, optical networking equipment from different vendors (e.g., filter 166 or transponder 175a) does not provide a multi-vendor/multi-generational solution to identify connecting (e.g., OTUCn, n×100 Gbits/s) wavelength port source and wavelength port destinations. Further, unstructured human input labels of circuit connections exist, but the labels are highly variable and inconsistent. Thus, neighbor connections 170 between an optical cross-connect port (e.g., port 168T) to a port location (e.g., port 178a) are indeterminable.

Example system 140 includes a wavelength circuit including node 150 and node 190 coupled to transport network 125, where node 150 and node 190 can be included in transport network 125. Node 150 includes DWDM/transport network devices including but not limited to optical transport NE shelf 160 that includes a plurality of optical hardware including a wavelength cross-connect 162 for switching individual wavelengths, optical interleaver and deinterleaver 164, local filter 166 (e.g., local filter shelf) with ports 168A-168AN, and native transponders (175a-175e) feeding wavelengths into local filter 166. Transponders 175a-175e may be from a first vendor while local filter 166 may be from a different vendor. Thus, transponders 175a-175e information from the first vendor may be recorded in inventory database 115 separately from local filter 166 information from a different vendor. Since the vendors determine the information for their equipment, neighbor connections 170 cannot be discovered by management systems from either vendor system or controller 110 with access to inventory database 115. In other words, controller 110 and inventory database 115 do not have information that transponder 175a and filter 166 are neighbors for which a neighbor connection 170 should be created. A similar problem can occur at node 190. Given the missing neighbor connections, there is no visibility for the service path between endpoint A due to missing neighbor connections 170 at node 150, and analogous missing neighbor connections for endpoint Z at node 190.

Example system 140 also includes optical network 180 and routers at endpoint A, router 185a, and at endpoint Z, router 185z. In some examples, optical network 180 can be part of transport network 125. Routers 185a and 185z with coherent pluggables create a wavelength connecting to a filter shelf/port on transport network device 182a and transport network device 182f, respectively, transport network devices 182a-182f of optical network 180 may be provided by a vendor (e.g., Cisco) and routers 185a and 185z may be provided by a different vendor (e.g., Juniper). While the vendors can cause the recording of their respective equipment into inventory database 115, neither vendors' management systems can discover neighbor connections 187a and/or neighbor connections 187z.

Human engineers enter port labels on the transponder 175a and filter 166 ports or optical cross-connects to identify from and to port locations. But the unstructured human input entries are notoriously inconsistent making automatic discovery of the neighbor connections 170, 187a, and 187z challenging. Some embodiments enable the interpretation and transformation of unstructured human input labels to enable end-to-end service visibility between endpoint A at node 150 and endpoint Z at node 190 (e.g., determining neighbor connections 170, respectively) as well as between router 185a and router 185z (e.g., determining neighbor connections 187a and neighbor connections 187z).

Figure 3:
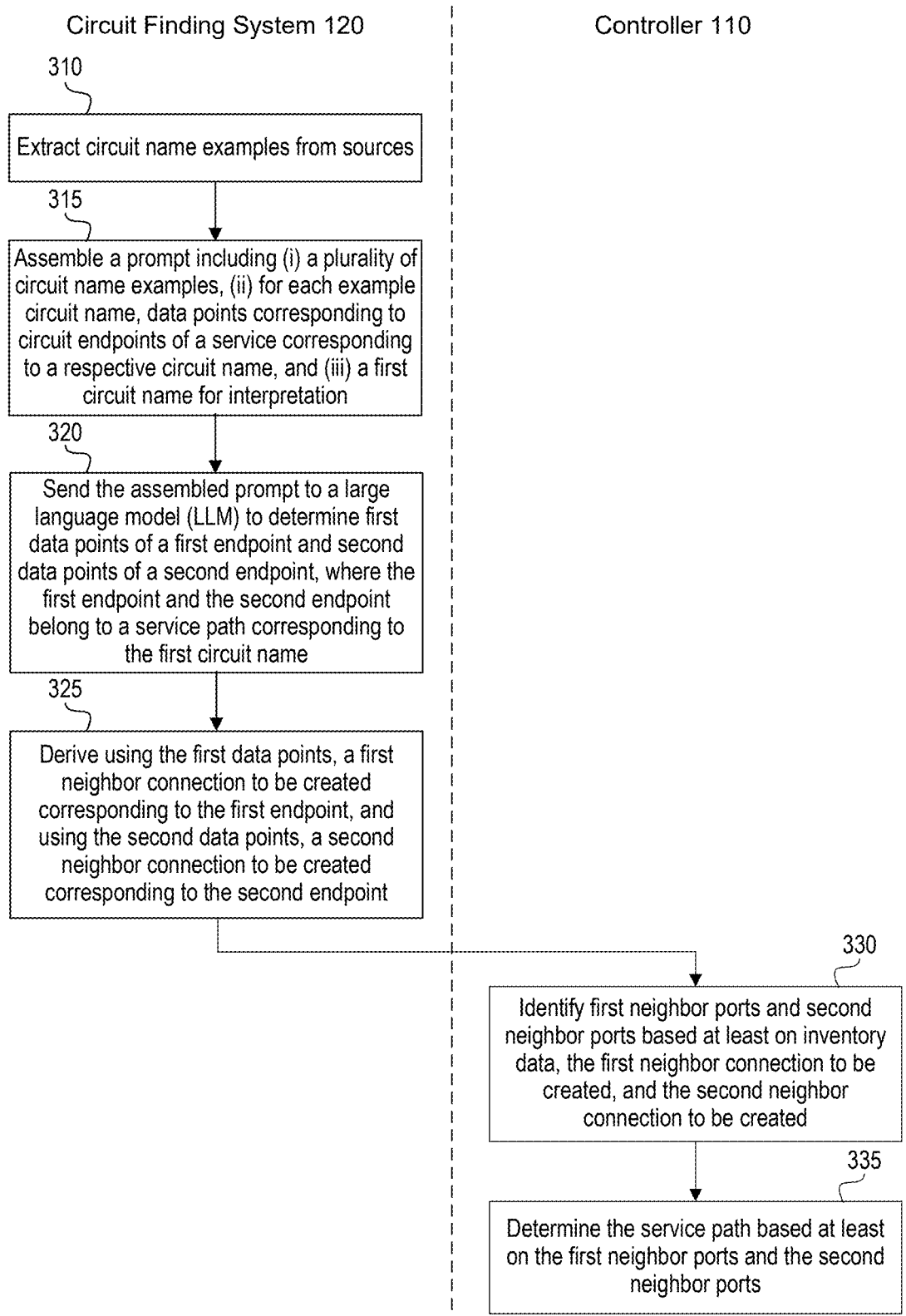
FIG. 3 illustrates an example method for using interpreted and transformed unstructured human input to determine neighbor connections enabling end-to-end service visibility, according to some embodiments of the disclosure.

FIG. 3 illustrates example method 300 for using interpreted and transformed unstructured human input to determine neighbor connections enabling end-to-end service visibility, according to some embodiments of the disclosure. As a convenience and not a limitation, FIG. 3 may be described with reference to elements from other figures in the disclosure. For example, FIG. 3 can describe, at a high level, interactions between controller 110, circuit finding system 120, and inventory database 115 of FIG. 1B.

At 310, circuit finding system 120 can extract unstructured human input labels (e.g., circuit name examples) from sources. Circuit names can come from disparate sources including but not limited to: descriptions on ports or connections discovered from the network, spreadsheets, and/or external inventory management systems. The connections discovered from the network (e.g., transport network 125) can include controller 110 obtaining data from various devices using a variety of protocols including but not limited to Transaction Language 1 (TL1), Simple Network Management Protocol (SNMP), command-line interface (CLI), NETCONF/YANG, and/or transport application programming interface (TAPI).

Circuit finding system 120 parses the circuit names from their sources and can output a CSV file with unique circuit names. The file may also contain information about whether the circuit is reserved. A reserved circuit is not currently provisioned in the network (e.g., transport network 125) but is reserved for future use). A sample output from circuit finding system 120 can be a comma-separated values (CSV) file as shown in Table 1 below. Each row includes an unstructured human input label (e.g., circuit name) and an indication of whether the circuit is reserved (e.g., true) or currently provisioned (e.g., false). In some examples, the unstructured human input can include common language location identification (CLLI) code.

TABLE 1

Sample CSV Output

| Circuit Name | Reserved |
| --- | --- |
| 1545.32_-_A_NODE1234_1/14-B_NODE-98786_28/2 | False |
| 1543.33_B_node-45234_4/2-A_NODE1234031_25/7_100G_Guide | False |
| 1544.13-DegA_NODE1234031_11/2_to_DegB_NODE-98786031_5/3 | True |
| 1556.96_-_A_NODE1234_21/4_-_B_NODE-98786_18/4 | False |
| 1559.39_B_NODE-98786_23/6-A_NODE1234-010_8/6 | False |
| 1560.20-A_Side_NODE1234-010_25/6_-_B_Side_NODE-98786_28/7_WAG | True |
| 1531.90_-_B_NODE1234_4/6-A_Node--7652_1/6 | False |
| 1560.61_A_node-45234_3/4-B_NODE1234031_1/6_100G_Guide | False |

At 315, circuit finding system 120 can assemble a prompt including (i) a plurality of circuit name examples such as rows 2-8 at column 1 of Table 1, (ii) for each example circuit name, data points corresponding to circuit endpoints of a service corresponding to a respective circuit name, and (iii) a first circuit name for interpretation such as row 1 at column 1 of Table 1.

At 320, circuit finding system 120 can send the assembled prompt including (i), (ii), and (iii) to a large language model (LLM) to determine first data points of a first endpoint and second data points of a second endpoint, where the first endpoint and the second endpoint belong to a service path corresponding to (iii) the first circuit name.

The plurality of circuit name examples (i) can include unstructured human input circuit names of valid circuit name derivations as a reference point for many known scenarios. The unstructured human input circuit names can be in CSV or other format.

The (ii) data points corresponding to (i) circuit name examples (rows 2-8 at column 1 of Table 1) can include but is not limited to the following data points for each circuit name, where near end refers to the wavelength endpoint A and far end refers to the wavelength endpoint Z:

Node/target identifiers (TIDs): Near end node (A), far end node (Z);
Shelf, slot, and/or port corresponding to transponder endpoint A and others for transponder endpoint Z;
Wavelength-division multiplexing (WDM) side, or reconfigurable optical add/drop multiplexer (ROADM) degree that corresponds to the filter shelf; and
Wavelength frequency that identifies what port on a DWDM filter the fiber is plugged into.

A Large Language Model (LLM) is an advanced type of artificial intelligence designed to understand, generate, and manipulate human language. Trained on vast amounts of text data, LLMs use deep learning techniques—particularly transformer architectures—to recognize patterns in language and predict what comes next in a sequence of words. This allows them to perform a wide range of language-based tasks, such as answering questions, writing essays, summarizing text, translating languages, coding, and even engaging in conversation.

Figure 4:
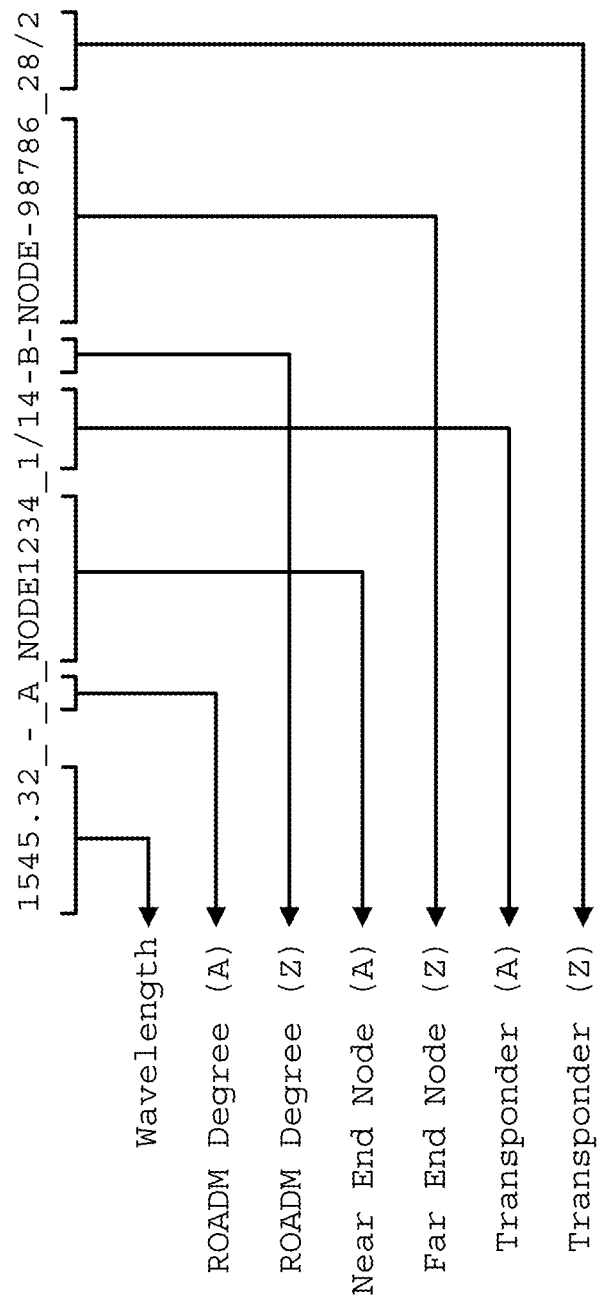
FIG. 4 illustrates an example of interpreting and transforming unstructured human input, according to some embodiments of the disclosure.

The LLM uses the (i) plurality of circuit name examples as well as the corresponding (ii) data points corresponding to each of the plurality of circuit names to then determine from (iii) the first circuit name for interpretation, first data points of a first endpoint and second data points of a second endpoint, where the first endpoint and the second endpoint belong to a service path corresponding to the first circuit name as illustrated in FIG. 4.

FIG. 4 illustrates example 400 of interpreting and transforming unstructured human input, according to some embodiments of the disclosure. As a convenience and not a limitation, FIG. 4 may be described with reference to elements from other figures in the disclosure. For example, FIG. 4 can refer to elements of FIG. 1B such as controller 110, circuit finding system 120, inventory database 115, node 150, transport network 125, and node 190. Example 400 uses the first circuit name in row 1 of Table 1 as an example of (iii) a first circuit name for interpretation. For example, given the first circuit name "1545.32-_A_NODE1234_1/14-B_NODE-98786_28/2" for interpretation, the LLM can determine the following data points shown below:

Node/target identifiers (TIDs): Near end node (A)="NODE1234", far end node (Z)="NODE-98786";
Shelf, slot, and/or port corresponding to transponder endpoint A="1-14" and another for transponder endpoint Z="28-2";
WDM side, or ROADM degree that corresponds to the filter shelf near end="A" and far end="B"; and
Wavelength frequency used between endpoints A and Z. The wavelength frequency also identifies what port on DWDM filter (e.g., filter 166 of FIG. 1B) the fiber is plugged into="1545.32".

The data points above can be used to identify neighbors corresponding to neighbor connections 170, neighbor connections 187a, and/or neighbor connections 187z. Neighbors are devices for which a neighbor connection should be created. Using the neighbor information and inventory data in inventory database 115, neighbor connections 170, 187a, 187z can be established (e.g., stitched together) in inventory database 115. The end-to-end service path visibility enables performance management, maintenance, and improvements of NEs on the end-to-end service path, leading to increased customer satisfaction.

FIG. 5 illustrates example 500 of obtaining data points corresponding to an end-to-end service, according to some embodiments of the disclosure. As a convenience and not a limitation, FIG. 5 may be described with reference to elements from other figures in the disclosure. For example, FIG. 5 can refer to elements of FIG. 1B, FIG. 4, and Table 1. Example 500 shows the LLM output of data points corresponding to the row 1, (iii) the first circuit name for interpretation. Another LLM output of data points for a different circuit name for interpretation is also included in example 500.

In example 500, the LLM determines from the first circuit name (iii), a first group of key parameters corresponds to the first data points of the first endpoint:
TID="NODE1234"
WDM side="A"
Shelf="1"
Slot="14"
Port="UNKNOWN"

In example 500, the LLM also determines from the first circuit name (iii), a second group of key parameters corresponds to the second data points of the second endpoint:
TID="NODE-98786"
WDM side="B"
Shelf="28"
Slot="2"
Port="UNKNOWN"

The wavelength frequency "1545.32" corresponds to both the first data points as well as the second data points. As shown in example 500, circuit finding system 120 can receive the LLM output in a JavaScript Object Notation (JSON) file.

Returning to 325 of method 300, circuit finding system 120 can derive using the first data points, neighbor devices of a first neighbor connection to be created corresponding to the first endpoint, and using the second data points, neighbor devices of a second neighbor connection to be created corresponding to the second endpoint.

Figure 6:
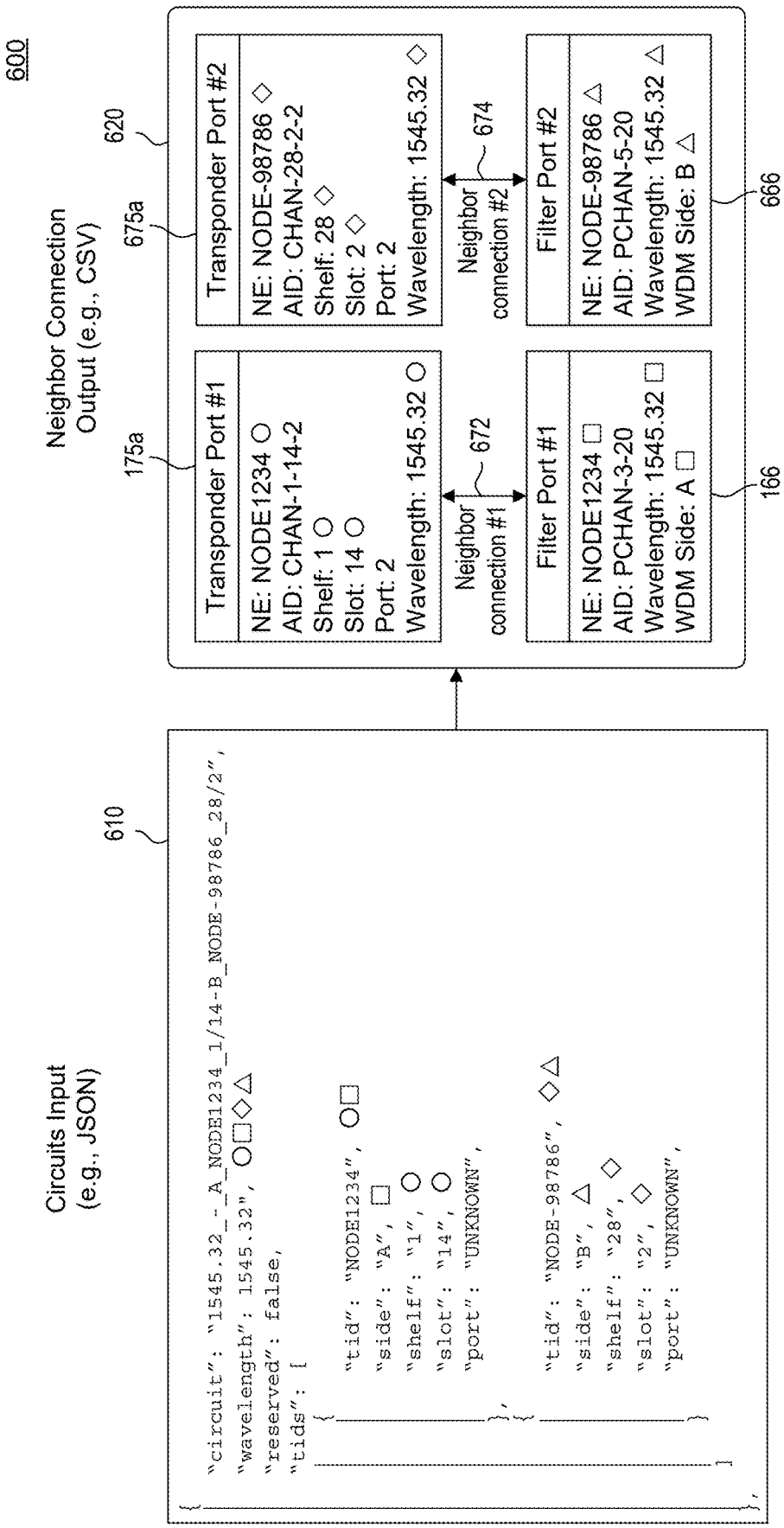
FIG. 6 illustrates an example of determined neighbors based on data points corresponding to an end-to-end service, according to some embodiments of the disclosure.

FIG. 6 illustrates example 600 of determined neighbors based on data points corresponding to an end-to-end service, according to some embodiments of the disclosure. As a convenience and not a limitation, FIG. 6 may be described with reference to elements from other figures in the disclosure. For example, FIG. 6 can refer to elements of FIG. 1B, FIG. 5, and Table 1. Example 600 can characterize the data points determined by the LLM (of FIG. 5) shown as input 610, and neighbors output 620. The circles ○, squares □, diamonds ◇, and triangles △ show how information from the circuit ID label is used to determine neighbor devices of a neighbor connection to be created.

Circuit finding system 120 can read the first data points from input 610 and arrange the information to determine that a first transponder noted by the circles ○, and a first filter noted by the squares □ correspond to the first data points, and they are neighbors of neighbor connection 672 that needs to be created. Without inventory data, circuit finding system 120 cannot determine which transponder port or which filter port make up the first neighbor ports of neighbor connection 672.

Circuit finding system 120 can read the second data points from input 610 and arrange the information to determine that a second endpoint transponder noted by the diamonds ◇, and a second filter noted by the triangles △ correspond to the second data points, and they are neighbors of neighbor connection 674 that needs to be created. Without inventory data, circuit finding system 120 cannot determine which transponder port or which filter port make up the second neighbor ports of neighbor connection 674. Circuit finding system 120 can transmit the neighbors output 620 to controller 110 (e.g., in a CSV file) or to inventory database 115.

FIG. 12 illustrates example 1200 that includes vendor reports in various formats, and a standardized data model, according to some embodiments of the disclosure. As a convenience and not a limitation, FIG. 12 can be described using elements from figures within the disclosure. For example, example 1200 can be described using elements from FIG. 1B, Table 1, and FIG. 6. Example 1200 uses information from row 1 of Table 1. shows that vendor A uses certain terms to describe the near end transponder 175a (marker 1210) with and filter 166 (marker 1220) while vendor B uses different terms (e.g., native vendor data) to describe far end transponder 675a (marker 1230) and filter 666 (marker 1240). For example, vendor A refers to "LABEL" (markers 1212 and 1222) as the circuit ID while vendor B refers to "DESCR" (markers 1232 and 1242). As another example, vendor A refers to "WAVELEN" (markers 1214 and 1224) while vendor B refers to "PORT" (markers 1234 and 1244) as well as "DEGREE" (marker 1246). Some embodiments transform data from the native vendor data (e.g., terms) to a standardized data model in query-able format so that "DESCR" (markers 1232, 1242) from vendor B is transformed to label information (markers 1230P, 1240P). The vendor A native data for transponder 175a (marker 1210) can be transformed to corresponding port components (marker 1210P) and AID components (marker 1210C). The vendor A native data for filter 166 (marker 1220) can be transformed to corresponding port components (marker 1220P) and AID components (marker 1220C). The vendor B native data for transponder 675a (marker 1230) can be transformed to corresponding port components (marker 1230P) and AID components (marker 1230C). The vendor B native data for filter 666 (marker 1240) can be transformed to corresponding port components (marker 1240P) and AID components (marker 1240C).

Returning to 330 of method 300, controller 110 can use the received neighbors output 620 to identify first neighbor ports and second neighbor ports based at least on inventory data, the first neighbor connection to be created, and the second neighbor connection to be created. In other words, the first neighbor connection 672 to be created is based on the first data points represented by the circles ○ and squares □ that identify the neighbors shown in neighbors output 620 of FIG. 6. Likewise, the second neighbor connection 674 to be created is based on the second data points represented by the diamonds ◇ and triangles △ that identify the neighbors shown in neighbors output 620 of FIG. 6.

Some embodiments utilize the DWDM inventory data in inventory database 115 which has already been discovered by the multi-vendor/multi-generational optical domain controller, controller 110, to correlate the identified neighbors to specific DWDM physical inventory data points. For example, controller 110 can access port components from inventory database 115 (markers 1210P, 1220P, 1230P, 1240P) as well as AID components (markers 1210C, 1220C, 1230C, and 1240C) of FIG. 12 to correlate with the identified neighbors. As shown at marker 1220P, WDM side or ROADM degree identifier (e.g., "A" for NODE1234) and a corresponding DWDM filter shelf identifier (PCHAN-3-20) are learned as part of the discovered network inventory. As described in example 1200, the ROADM degree identifier and DWDM filter shelf identifier can be different depending on device and equipment types as well as the vendor. As shown at marker 1210C, transponder line port 2 (e.g., port 178a) is also learned as part of the discovered network inventory from the DWDM device (e.g., markers 1210 and 1210C). For transponder 175a, with port CHAN-1-14-2, the corresponding prefix (CHAN) and suffix port identifier (2) corresponding to port 178a, is different depending on device, equipment type, and vendor. The transponder line port (port 178a) will be tuned to the same wavelength (frequency 1545.32) as defined in the circuit ID (see markers 1210, 1210P, 1210C as well as 1230, 1230P, 1230C). Wavelength frequencies are also converted to the specific filter port according to the type of device, equipment type, and vendor (see markers 1220, 1220P, 1220C, as well as 1240, 1240P, 1240C).

Figure 7:
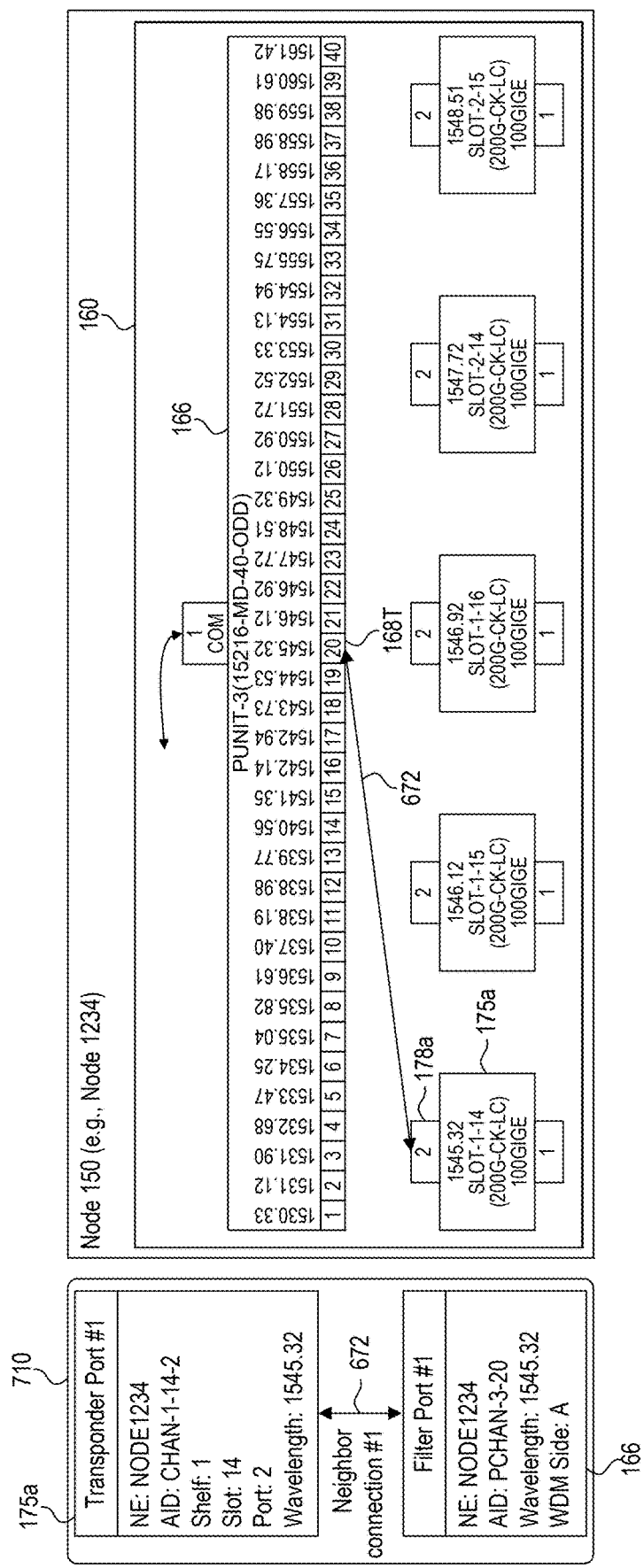
FIG. 7 illustrates an example of a near end neighbor connection corresponding to an end-to-end service based on data points and inventory data, according to some embodiments of the disclosure.

FIG. 7 illustrates example 700 of a near end neighbor connection 672 based on first data points corresponding to an end-to-end service and inventory data, according to some embodiments of the disclosure. As a convenience and not a limitation, FIG. 7 may be described with reference to elements from other figures in the disclosure. For example, FIG. 7 can refer to elements of FIG. 6. Example 700 includes the neighbor output 710 corresponding to first data points after accessing inventory data from inventory database 115. Neighbor connection 672 illustrates that transponder 175a at port 2 (port 178a) is communicatively coupled to filter 166 at port 20 (also labelled as port 168T).

As shown in neighbors output 620 of FIG. 6, controller 110 can access inventory data of inventory database 115 and in conjunction with the neighbor information (shown by the circles ○ and squares □) determine the neighbor ports for neighbor connection 672 that needs to be created. Controller 110 can determine that the first transponder has an Access Identifier (AID) of CHAN-1-14-2. For example, controller 110 can access inventory database 115 to determine which transponder at near end node, NODE1234, corresponds to shelf 1, slot 14, and utilizes wavelength frequency 1545.32. Transponder 175a with AID CHAN-1-14-2 utilizes port 2 (port 178a) on wavelength frequency 1545.32. Controller 110 can access inventory database 115 to determine which filter at near end node, NODE1234, corresponds to WDM side A, and utilizes wavelength frequency 1545.32. For example, WDM side A on NODE 1234 corresponds to filter PCHAN-3 (also known as PUNIT-3), that operates on wavelength frequency 1545.32 using port 20 (port 168T). Thus, filter 166 with AID PCHAN-3-20 is identified. Accordingly, the first neighboring ports for neighbor connection 672 are identified as transponder 175a with AID CHAN-1-14-2 (port 178a) and filter 166 with AID PCHAN-3-20 (port 168T) as shown in FIG. 7.

Figure 8:
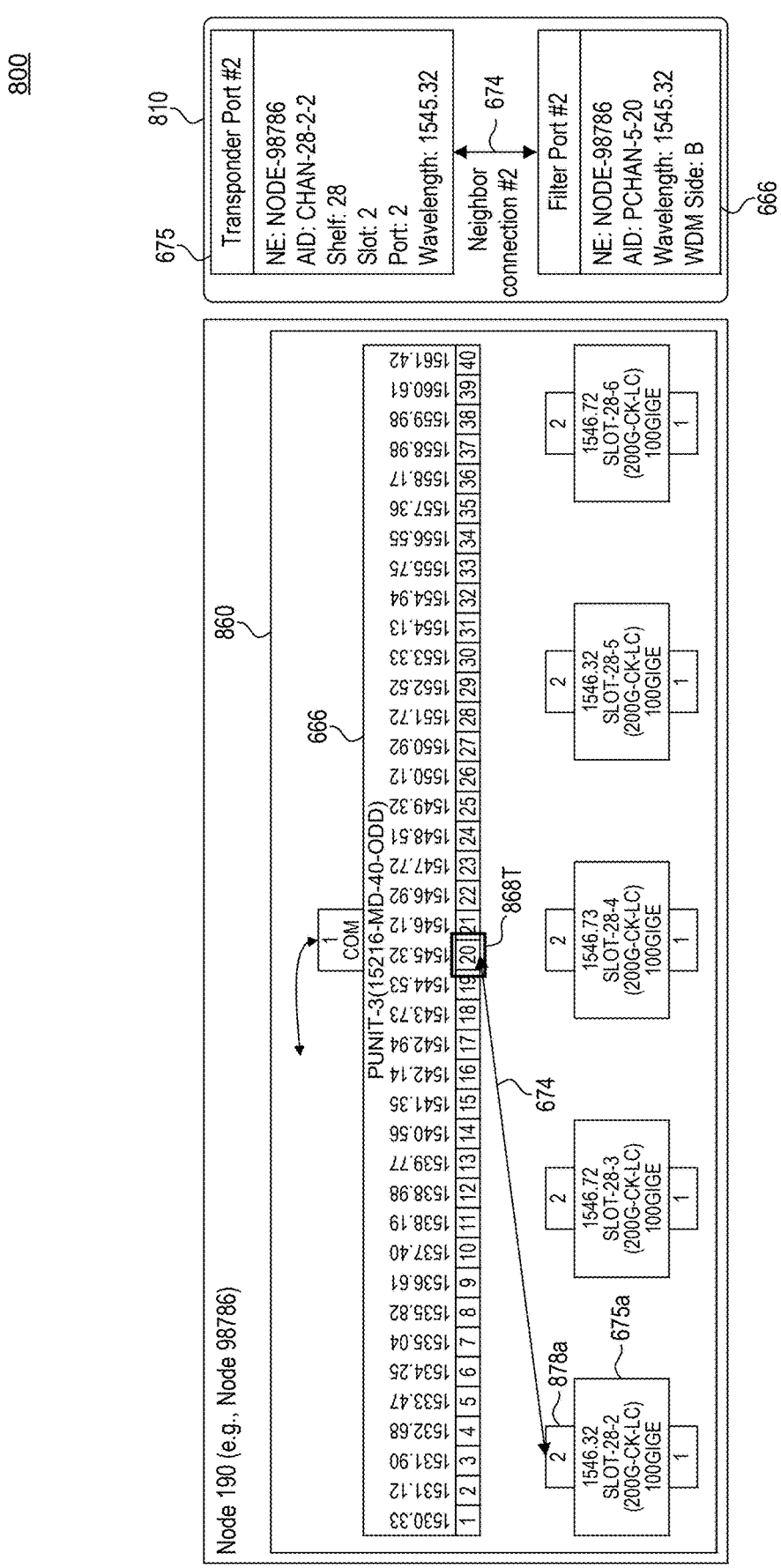
FIG. 8 illustrates an example of a far end neighbor connection corresponding to an end-to-end service based on data points and inventory data, according to some embodiments of the disclosure.

FIG. 8 illustrates example 800 of a far end neighbor connection 674 based on second data points corresponding to an end-to-end service and inventory data, according to some embodiments of the disclosure. As a convenience and not a limitation, FIG. 8 may be described with reference to elements from other figures in the disclosure. For example, FIG. 8 can refer to elements of FIG. 6. Example 800 includes the neighbor output 810 corresponding to second data points after accessing inventory data from inventory database 115. Neighbor connection 674 illustrates that transponder 675a at port 2 (port 878a) is communicatively coupled to filter 666 at port 20 (also labelled as port 868T).

As shown in neighbors output 620 of FIG. 6, controller 110 can access inventory data of inventory database 115 and in conjunction with the neighbor information (shown by the diamonds ◇ and triangles △) determine the neighbor ports for neighbor connection 674 that needs to be created. Controller 110 can determine that the second transponder has an AID of CHAN-28-2-2. For example, controller 110 can access inventory database 115 to determine which transponder at far end node, NODE-98786, corresponds to shelf 28, slot 2, and utilizes wavelength frequency 1545.32. Transponder 675a with AID CHAN-28-2-2 utilizes port 2 (port 878a) on wavelength frequency 1545.32. Controller 110 can access inventory database 115 to determine which filter at far end node, NODE-98786, corresponds to WDM side B, and utilizes wavelength frequency 1545.32. For example, WDM side B on NODE-98786 corresponds to filter PCHAN-5, that operates on wavelength frequency 1545.32 using port 20. Thus, filter 666 with AID PCHAN-5-20 (shown as port 868T) is identified. Accordingly, the second neighboring ports for neighbor connection 674 are identified as transponder 675a with AID CHAN-28-2-2 (port 878a) and filter 666 with AID PCHAN-5-20 (port 868T) as shown in FIG. 8.

FIG. 9 illustrates example 900 of data points based on interpretation and transformation of unstructured human input, according to some embodiments of the disclosure. As a convenience and not a limitation, FIG. 9 may be described with reference to elements from other figures in the disclosure. For example, FIG. 9 can refer to elements of FIG. 1B, FIG. 5, and Table 1. Example 900 illustrates the data points obtained from the interpretation and transformation of a variety of unstructured human input of circuit IDs. For example, the Circuit IDs on each row do not follow the exact same format and are also not in the same order of data.

Returning to method 300 at 335, controller 110 can determine the service path based at least on the first neighbor ports and the second neighbor ports. As described above, the first neighboring ports for neighbor connection 672 are identified as transponder 175a with AID CHAN-1-14-2 (port 178a) and filter 166 with AID PCHAN-3-20 (port 168T) as shown in FIG. 7. Thus, transponder 175a with AID CHAN-1-14-2 (port 178a) and filter 166 with AID PCHAN-3-20 (port 168T) can be built or stitched together in a multi-vendor/multi-generational optical controller inventory database, inventory database 115.

The second neighboring ports for neighbor connection 674 are identified as transponder 675a with AID CHAN-28-2-2 (port 878a) and filter 666 with AID PCHAN-5-20 (port 868T) as shown in FIG. 8. Thus, transponder 675a with AID CHAN-28-2-2 (port 878a) and filter 666 with AID PCHAN-5-20 (port 868T) can be built or stitched together in a multi-vendor/multi-generational optical controller inventory database, inventory database 115.

Accordingly, controller 110 can determine that the service path includes transponder 175a with AID CHAN-1-14-2 (port 178a) at endpoint A and transponder 675a with AID CHAN-28-2-2 (port 878a) at endpoint Z. Once the neighbors and neighboring connections are built in inventory database 115, end-to-end circuits can be discovered by controller 110. Controller 110 can have visibility of the end-to-end service path and provide monitoring and management for the network elements as well as the service running on the end-to-end service path.

A similar method can be performed to determine neighbor connection 187a and neighbor connection 187z of FIG. 1B.

Figure 10:
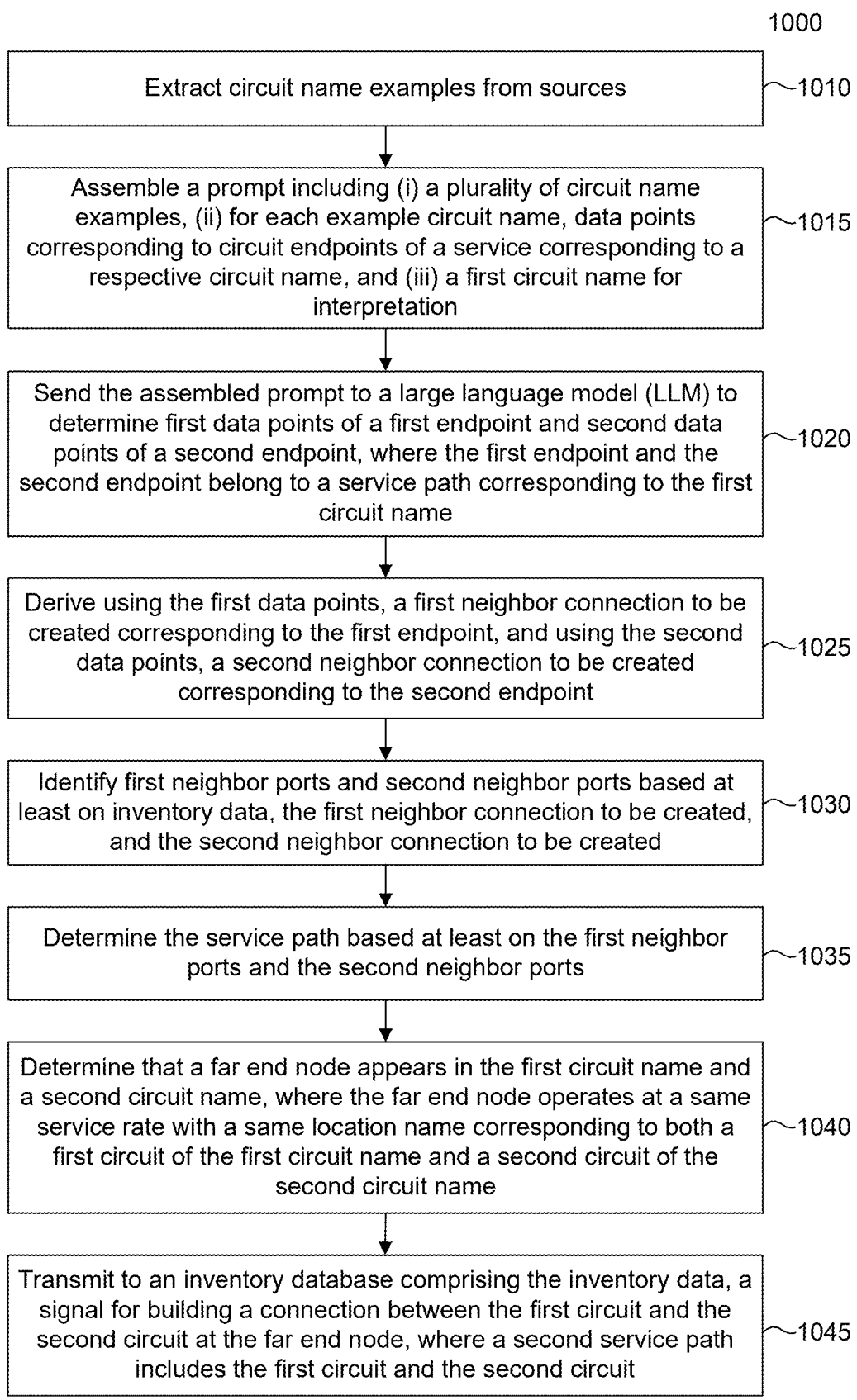
FIG. 10 illustrates a method for a system for interpretation and transformation of unstructured human input to enable end-to-end service visibility, according to some embodiments of the disclosure.

FIG. 10 illustrates method 1000 for a system for interpretation and transformation of unstructured human input to enable end-to-end service visibility, according to some embodiments of the disclosure. As a convenience and not a limitation, FIG. 10 may be described with reference to elements from other figures in the disclosure. For example, FIG. 10 can describe, at a high level, interactions between controller 110, circuit finding system 120, and inventory database 115 of FIG. 1B, FIG. 2, and FIG. 3. The system performing method 1000 can include a combination of circuit finding system 120 and controller 110. Explanations may refer to above descriptions.

At 1010, the system can extract circuit name examples from sources. (See FIG. 3 at 310 and Table 1.)

At 1015, the system can assemble a prompt including (i) a plurality of circuit name examples, (ii) for each example circuit name, data points corresponding to circuit endpoints of a service corresponding to a respective circuit name, and (iii) a first circuit name for interpretation. (See FIG. 3 at 315.)

At 1020, the system can send the assembled prompt to an LLM to determine first data points of a first endpoint and second data points of a second endpoint, where the first endpoint and the second endpoint belong to a service path corresponding to the first circuit name. (See FIG. 3 at 320, FIG. 4, FIG. 5.)

At 1025, the system can derive using the first data points, a first neighbor connection to be created corresponding to the first endpoint, and using the second data points, a second neighbor connection to be created corresponding to the second endpoint. (See FIG. 3 at 325, FIG. 6, FIG. 12.)

At 1030, the system can identify first neighbor ports and second neighbor ports based at least on inventory data, the first neighbor connection to be created, and the second neighbor connection to be created. (See FIG. 3 at 330, FIG. 7, FIG. 8, FIG. 9.)

At 1035, the system can determine the service path based at least on the first neighbor ports and the second neighbor ports. (See FIG. 3 at 335.)

At 1040, the system can determine that a far end node appears in the first circuit name and a second circuit name, where the far end node operates at a same service rate with a same location name corresponding to both a first circuit of the first circuit name and a second circuit of the second circuit name. (See FIG. 2 at 210 and FIG. 1A.)

At 1045, the system can transmit to an inventory database comprising the inventory data, a signal for building a connection between the first circuit and the second circuit at the far end node, where a second service path includes the first circuit and the second circuit. (See FIG. 2 at 220 and 230, and FIG. 1A.)

Figure 11:
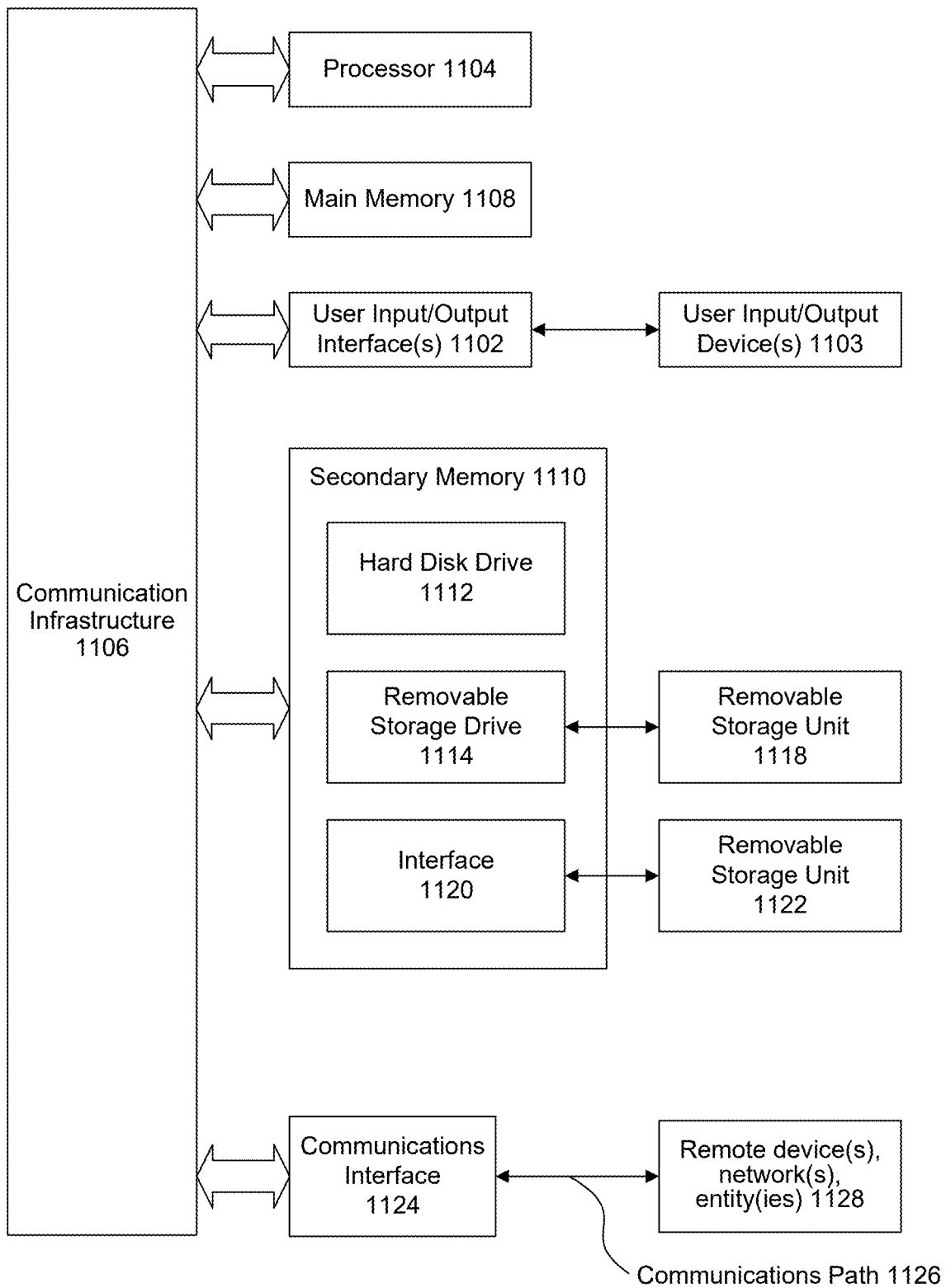
FIG. 11 is an example computer system for implementing some embodiments or portion(s) thereof.

FIG. 11 is an example computer system for implementing some embodiments or portion(s) thereof. Various embodiments can be implemented, for example, using one or more well-known computer systems, such as computer system 1100 shown in FIG. 11. Computer system 1100 can be any well-known computer capable of performing the functions described herein. For example, and without limitation, computer system 1100 may perform functions performed by circuit finding system 120, controller 110, or a combination of circuit finding system 120 and controller 110 as described in: FIGS. 1A, 1B, 4-9, and can perform methods 200, 300, and 1000 of FIGS. 2, 3, and 10 respectively. Other apparatuses and/or components shown in the figures may be implemented using computer system 1100, or portions thereof.

Computer system 1100 includes one or more processors (also called central processing units, or CPUs), such as a processor 1104. Processor 1104 is connected to a communication infrastructure 1106 that can be a bus. One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM).

Main memory 1108 may include one or more levels of cache. Main memory 1108 has stored therein control logic (e.g., computer software) and/or data. Processor 1104 can be communicatively coupled to main memory 1108, for example.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for determining an end-to-end service path, comprising:
   (a) assembling a prompt comprising (i) a plurality of example circuit names, (ii) for each example circuit name in the plurality of example circuit names, data points corresponding to circuit endpoints of a service corresponding to a respective example circuit name, and (iii) a circuit name for interpretation;
   (b) sending the assembled prompt to a large language model (LLM) to determine first data points of a first endpoint and second data points of a second endpoint, wherein the first endpoint and the second endpoint belong to a service path corresponding to the circuit name; and (c) deriving using the first data points, a first neighbor connection to be created corresponding to the first endpoint, and using the second data points, a second neighbor connection to be created corresponding to the second endpoint, (d) wherein the first neighbor connection to be created corresponding to the first endpoint and the second neighbor connection to be created corresponding to the second endpoint enable determination of the service path.

2. The computer implemented method of claim 1, further comprising, transmitting to an inventory database comprising inventory data, the first neighbor connection based on first neighbor ports and the second neighbor connection based on second neighbor ports.

3. The computer implemented method of claim 1, further comprising, transmitting to a controller, the first neighbor connection based on first neighbor ports and the second neighbor connection based on second neighbor ports.

4. The computer implemented method of claim 1, wherein the data points corresponding to the circuit endpoints of the service corresponding to the respective example circuit name (a)(ii) comprise:
(a) a target identifier (TID) found in the respective example circuit name; and
(b) a wavelength-division multiplexing (WDM) side of the TID.

5. The computer implemented method of claim 1, wherein the sending (b) comprises a comma-separated values (CSV) file comprising the circuit name, the computer implemented method further comprising receiving a JavaScript Object Notation (JSON) file comprising the first data points and the second data points.

6. The computer implemented method of claim 1, further comprising:
(a) extracting circuit names from sources including the plurality of example circuit names and the circuit name; and
(b) outputting the circuit names in a comma-separated values (CSV) file, wherein each example circuit name in the plurality of example circuit names is unique.

7. The computer implemented method of claim 6, wherein the sources comprise:
descriptions on ports, connections discovered from a network, a spreadsheet, or an external inventory management system.

8. The computer implemented method of claim 6, wherein the outputting further comprises information indicating whether the circuit name is provisioned or reserved for future use.

9. A non-transitory computer-readable medium having instructions stored thereon that, when executed by a processor of a computing device, cause the computing device to perform operations for determining an end-to-end service path, the operations comprising:
(a) assembling a prompt comprising (i) a plurality of example circuit names, (ii) for each example circuit name in the plurality of example circuit names, data points corresponding to circuit endpoints of a service corresponding to a respective example circuit name, and (iii) a circuit name for interpretation;
(b) sending the assembled prompt to a large language model (LLM) to determine first data points of a first endpoint and second data points of a second endpoint, wherein the first endpoint and the second endpoint belong to a service path corresponding to the circuit name; and (c) deriving using the first data points, a first neighbor connection to be created corresponding to the first endpoint, and using the second data points, a second neighbor connection to be created corresponding to the second endpoint, (d) wherein the first neighbor connection to be created corresponding to the first endpoint and the second neighbor connection to be created corresponding to the second endpoint enable determination of the service path.

10. The non-transitory computer-readable medium of claim 9, wherein the operations further comprise transmitting to an inventory database comprising inventory data, the first neighbor connection based on first neighbor ports and the second neighbor connection based on second neighbor ports.

11. The non-transitory computer-readable medium of claim 9, wherein the operations further comprise transmitting to a controller, the first neighbor connection based on first neighbor ports and the second neighbor connection based on second neighbor ports.

12. The non-transitory computer-readable medium of claim 9, wherein the data points corresponding to the circuit endpoints of the service corresponding to the respective example circuit name (a)(ii) comprise:
(a) a target identifier (TID) found in the respective example circuit name; and
(b) a wavelength-division multiplexing (WDM) side of the TID.

13. The non-transitory computer-readable medium of claim 9, wherein the sending (b) operation comprises a comma-separated values (CSV) file comprising the circuit name, the operations further comprising receiving a JavaScript Object Notation (JSON) file comprising the first data points and the second data points.

14. The non-transitory computer-readable medium of claim 9, wherein the operations further comprise:
(a) extracting circuit names from sources including the plurality of example circuit names and the circuit name; and
(b) outputting the circuit names in a comma-separated values (CSV) file, wherein each example circuit name in the plurality of example circuit names is unique.

15. The non-transitory computer-readable medium of claim 14, wherein the sources comprise: descriptions on ports, connections discovered from a network, a spreadsheet, or an external inventory management system.

16. The non-transitory computer-readable medium of claim 14, wherein the outputting further comprises information indicating whether the circuit name is provisioned or reserved for future use.

17. A system for determining an end-to-end service path, comprising:
a memory; and
a processor communicatively coupled to the memory, configured to:
(a) assemble a prompt comprising (i) a plurality of example circuit names, (ii) for each example circuit name in the plurality of example circuit names, data points corresponding to circuit endpoints of a service corresponding to a respective example circuit name, and (iii) a circuit name for interpretation;
(b) send the assembled prompt to a large language model (LLM) to determine first data points of a first endpoint and second data points of a second endpoint, wherein the first endpoint and the second endpoint belong to a service path corresponding to the circuit name; and (c) derive using the first data points, a first neighbor connection to be created corresponding to the first endpoint, and using the second data points, a second neighbor connection to be created corresponding to the second endpoint, (d) wherein the first neighbor connection to be created corresponding to the first endpoint and the second neighbor connection to be created corresponding to the second endpoint enable determination of the service path.

18. The system of claim 17, wherein the processor is further configured to transmit to an inventory database comprising inventory data, the first neighbor connection based on first neighbor ports and the second neighbor connection based on second neighbor ports.

19. The system of claim 17, wherein the data points corresponding to the circuit endpoints of the service corresponding to the respective example circuit name comprise:

(a) a target identifier (TID) found in the example circuit name; and (b) a wavelength-division multiplexing (WDM) side of the TID.

20. The system of claim 17, wherein the processor is further configured to:

(a) extract circuit names from sources including the plurality of example circuit names and the circuit name; and (b) output the circuit names in a comma-separated values (CSV) file, wherein each example circuit name in the plurality of example circuit names is unique.

* * * * *